United States Patent [19]

Ruhl

[11] Patent Number: 4,472,128
[45] Date of Patent: Sep. 18, 1984

[54] QUICK CHANGE LOCATOR CLAMP ASSEMBLY FOR PLASTIC MOLDING MACHINE

[75] Inventor: Edward A. Ruhl, Southfield, Mich.

[73] Assignee: Sharp Die and Mold Co., Fraser, Mich.

[21] Appl. No.: 500,537

[22] Filed: Jun. 2, 1983

[51] Int. Cl.³ .............................................. B29C 5/00
[52] U.S. Cl. ................................. 425/186; 425/192 R; 425/451.9
[58] Field of Search ................ 425/185, 192 R, 451.9, 425/190, 191, 186

[56] References Cited

U.S. PATENT DOCUMENTS 3,111,895  11/1963  Kraft et al. ........................ 425/451.9

*Primary Examiner*—Jeffery Thurlow
*Assistant Examiner*—V. Fischbach
*Attorney, Agent, or Firm*—Cullen, Sloman, Cantor, Grauer, Scott & Rutherford

[57] ABSTRACT

A quick change locator clamp assembly for a plastic molding machine having opposed top and bottom platens adapted to receive, mount and support a sectional die having top and bottom clamp plates which comprises laterally spaced pairs of opposed locator clamp assemblies mounted upon and projecting from the platens. Formed within the clamp plates on one side of the molding die are similarly spaced opposed pairs of locator slots. Each clamp assembly includes a locator key mounted upon a platen of a shape to snugly receive the corresponding clamp plate slot for locating the molding die in a predetermined position relative to the platens. A rotatable clamp is mounted upon the key and adapted for operative retaining engagement with an adjacent clamp plate. The sectional die includes a reciprocal ejector plate, there being at least one reciprocal knockout bar on the molding machine. A reciprocal lifter plate within the bottom anchor plate is connected to the ejector plate and removably interlocked with the knock-out bar.

10 Claims, 7 Drawing Figures

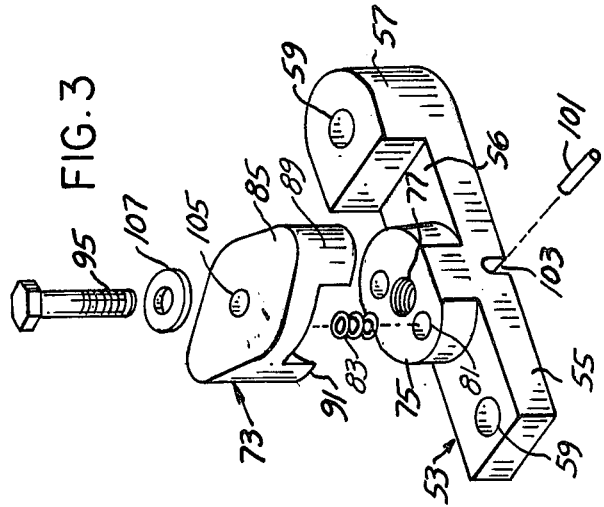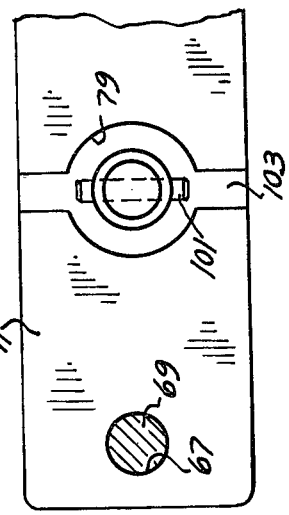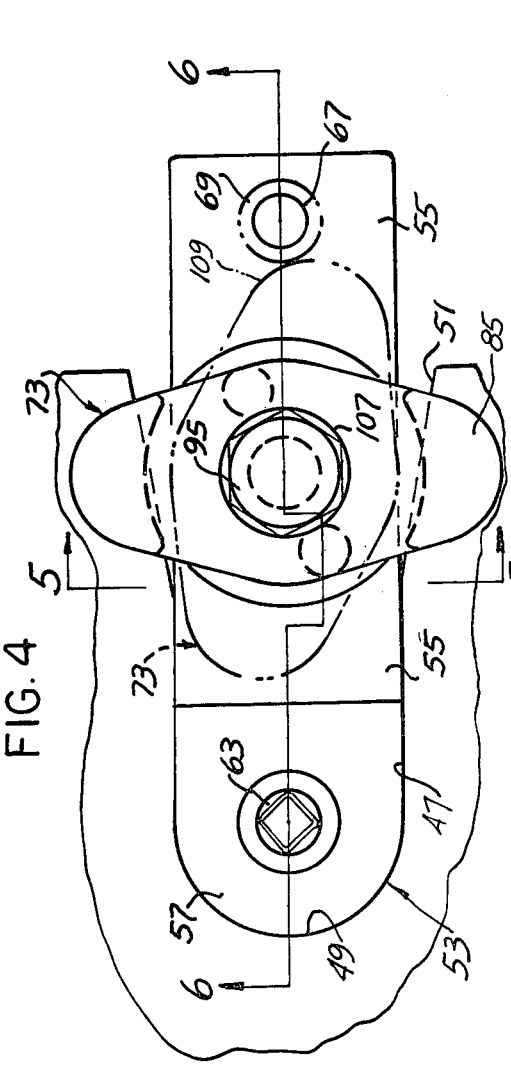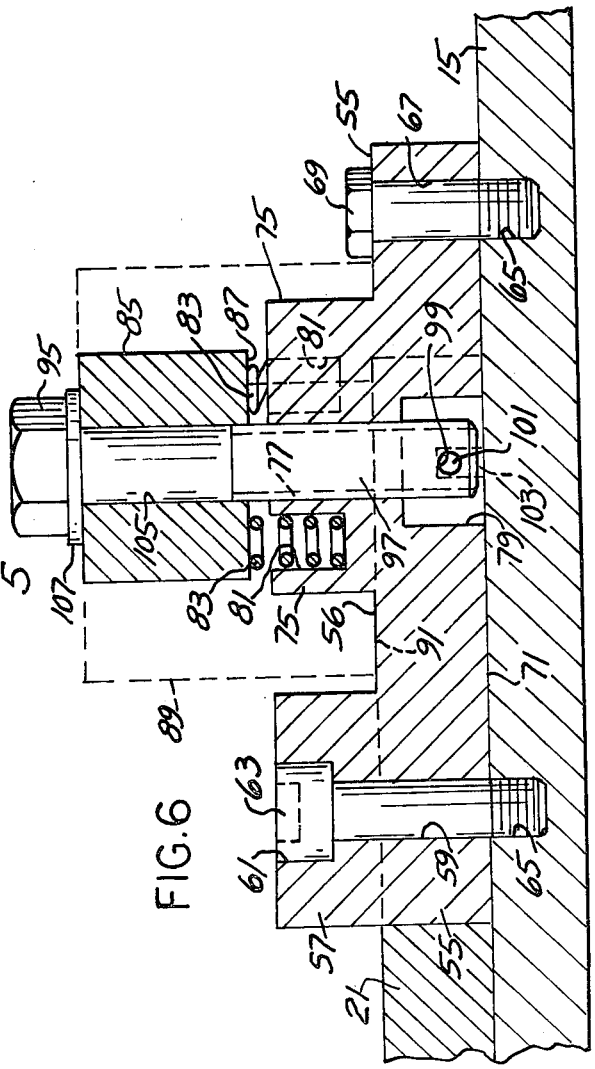

QUICK CHANGE LOCATOR CLAMP ASSEMBLY FOR PLASTIC MOLDING MACHINE

BACKGROUND OF THE INVENTION

Heretofore sectional plastic molding dies having top and bottom clamp plates or clamping slots integral to the die have been removably positioned within and between stationary and movable platens of a molding machine and suitably secured thereto. Often times the plastic molding machine may employ additional plastic molding assemblies to replace the first mentioned plastic mold assembly. The problem heretofore has been in the dissassembly of a sectional plastic molding die from the said platens and the reassembly of a different plastic molding die thereon required a separate securing of the anchor plates thereof to the corresponding platens of the molding machine. Locating rings upon the cavity halves were needed to effectively align the cavity tools to the respective platens. This has required considerable period of time in reanchoring and realigning successively the second or third plastic molding assembly upon the molding machine so that the same molding machine may be used surely for a plurality of different molding operations including the use of separately employed plastic molding sectional die assemblies.

Heretofore there has existed a need by which in a simple manner a first plastic molding die may be quickly located and mounted upon the platens of a molding machine and secured thereon for a particular molding operation and wherein a means will be provided for unclamping the first plastic molding die and locating and reassembling a second plastic molding die for a different job into the plastic molding machine and clamping the same thereon.

SUMMARY OF THE INVENTION

An important feature of the present invention is to provide a quick change locator and clamp assembly for a plastic molding machine having opposed top and bottom platens adapted to receive, mount and support a sectional die having top and bottom clamp plates.

It is a further feature to provide laterally spaced pairs of opposed locator clamp assemblies upon the platens and wherein formed within the clamp plates upon one side of the molding die are similarly spaced opposed pairs of locator slots and wherein each locator clamp assembly includes a locator key secured to the platen of a shape to snugly and guidably receive a corresponding clamp plate slot for locating a molding die in a predetermined position relative to the platens. This precludes the need for the commonly utilized locating ring.

A further feature includes as a part of the locator clamp assembly a rotatable clamp mounted upon the key and adapted for operative retaining engagement with the adjacent clamp plate.

A further feature incorporates the use of a pair of opposed locator clamp assemblies mounted upon and projecting from the corresponding platens of a plastic molding machine wherein each locator clamp assembly includes a key adapted to receive the corresponding guide slot upon the edges of adjacent clamp plates upon one side of the molding die and wherein a clamp upon the key is rotated for operative retaining engagement with the adjacent clamp plate. The respective locator keys and clamps secure the lower portions of the respective clamp plates and associated sectional molding die to the platens. After location and clamping, the upper portions of the respective clamp plates are secured to the corresponding platens by fasteners.

These and other feature and objects will be seen from the following specification and claims in conjunction with the appended drawings.

THE DRAWINGS

FIG. 3 is a perspective view of the present locator clamp assembly.

FIG. 4 is a plan view of the present locator clamp assembly as received within one of the clamp plate slots of the plastic mold die assembly shown in FIG. 1.

FIG. 6 is fragmentary longitudinal section taken in the direction of arrows 6—6 of FIG. 4 partly broken away and sectioned.

FIG. 7 is a fragmentary bottom plan view of the locator key shown in FIG. 4.

It will be understood that the above drawings illustrate merely a preferred embodiment of the invention and that other embodiments are contemplated within the scope of the claims hereafter set forth.

DETAILED DESCRIPTION OF AN EMBODIMENT OF THE INVENTION

Figure 1:
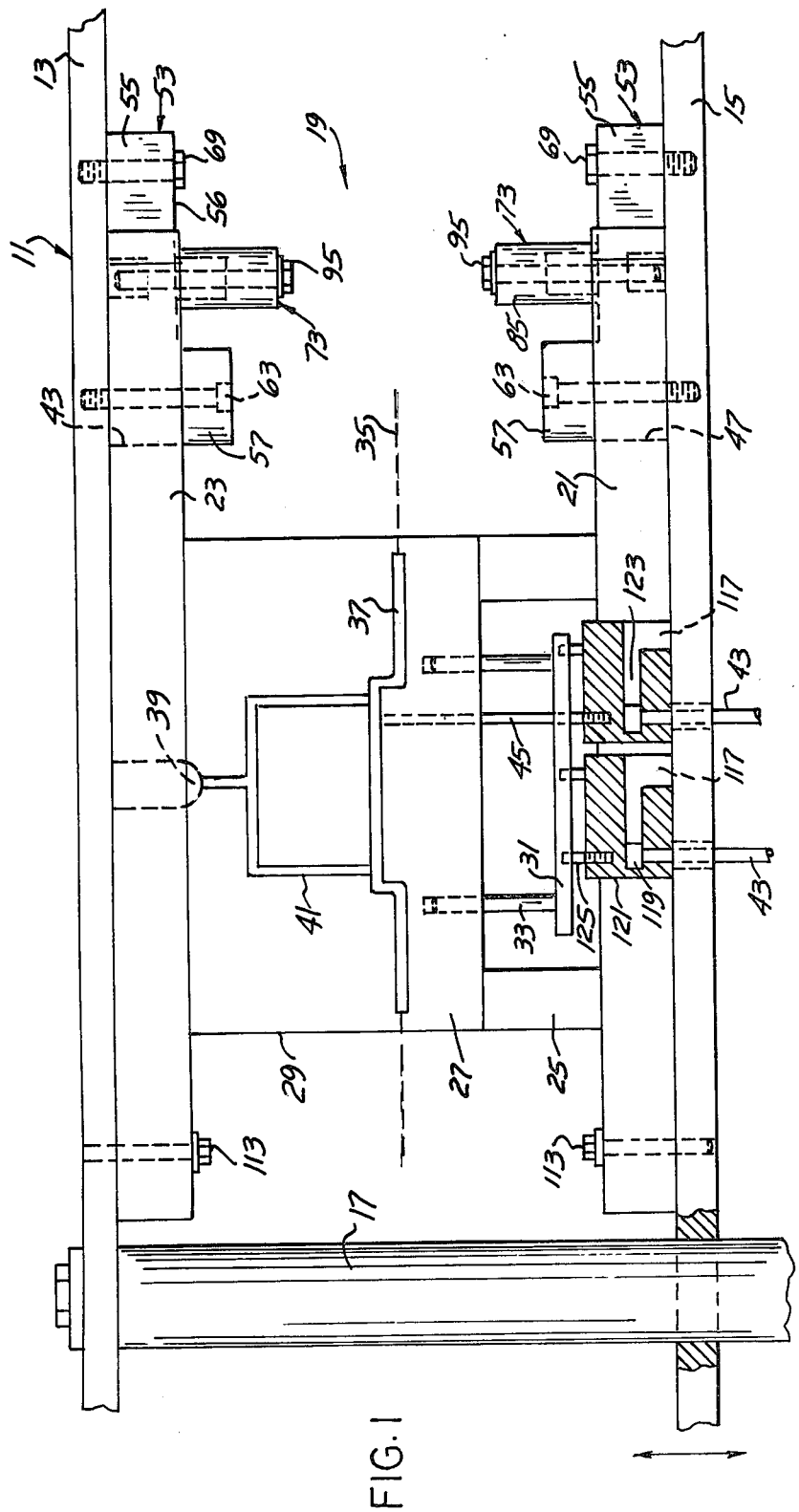
FIG. 1 is a fragmentary end elevational view of a conventional plastic molding machine having a pair of relatively movable platens between which is removably secured a sectional plastic molding die assembly.

Referring to the drawings, there is fragmentarily shown in FIG. 1 a conventional plastic molding machine 11 such as the well known 700 ton Cincinnati Molding Machine which has the conventional stationary platen 13, fragmentarily shown, and aligned therewith the conventional reciprocal platen 15, fragmentarily shown. Extending between said platens for maintaining registry therebetween are pairs of laterally spaced guide rods 17, FIG. 2. As is conventional, normally the guide rods 17 are suitably secured to the stationary platen 13, FIG. 1, and the reciprocal platen 15 has corresponding apertures therethrough for guidably receiving the rods 17.

The conventional plastic mold machine, fragmentarily shown in FIG. 1, is adapted to receive in a conventional manner a sectional injection plastic molding assembly 19, schematically shown, which includes a conventional bottom clamp plate 21 and spaced therefrom a conventional top clamp plate 23.

As is conventional, bottom clamp plate 21 is usually secured to the movable platen 15. The conventional top clamp plate 23 is usually secured in a conventional manner to stationary platen 13.

The conventional sectional injection plastic molding assembly 19 normally includes a pair of laterally spaced rails 25 of rectangular cross section which are mounted upon and secured to bottom clamp plate 21.

A conventional core block 27 is mounted upon, spans and is suitably secured to the rails 25. A conventional cavity plate 29 forms a part of the sectional injection plastic molding assembly, guidably mounted upon and with respect to the core block 27 and is suitably secured to the overlying clamp plate 23. A conventional ejector plate 31 interposed between rails 25 normally spaced from core block 27 and includes conventional guide rods 33 secured thereto adapted for reciprocal movements within corresponding bores within said core block.

A conventional parting line 35 is designated in FIG. 1 between the core block 27 and cavity plate 29, between which there is defined a mold cavity 37 for the molding of a plastic article as desired of a predetermined shape. As is conventional, the top clamp plate 23 employes a centrally disposed sprew aperture 39 connected to the transverse passages 41 adapted for delivering pressurized plastic material from the molding machine for entering the mold cavity 37 between core block 27 and cavity plate 29.

Normally there are provided within the conventional plastic molding machine and extending through the movable platen 15 thereof laterally spaced pairs of conventional knock-out bars 43 which are adapted for engagement with the ejector plate 31 at a particular time during retraction of the movable platen 15 such that the connected ejector pins 45 move through corresponding bores within the core block 27, for lifting and separating the molded article from the cavity 37 in core block 27 during separation of the sectional portions of the plastic molding die 19.

The foregoing description of the environment in which the present invention is applied is reasonably conventional and a further description of the detail, function and operation of the respective rejection plastic molding die 19 is omitted. Plastic molding dies are conventional and well known in the art. Opposed pairs of locator clamps are mounted upon corresponding platens of the molding machine; and are adapted to guidably receive the corresponding slotted portions of the top and bottom anchor plates 23, 21 on one side of the plastic mold die 19, FIG. 1.

Figure 2:
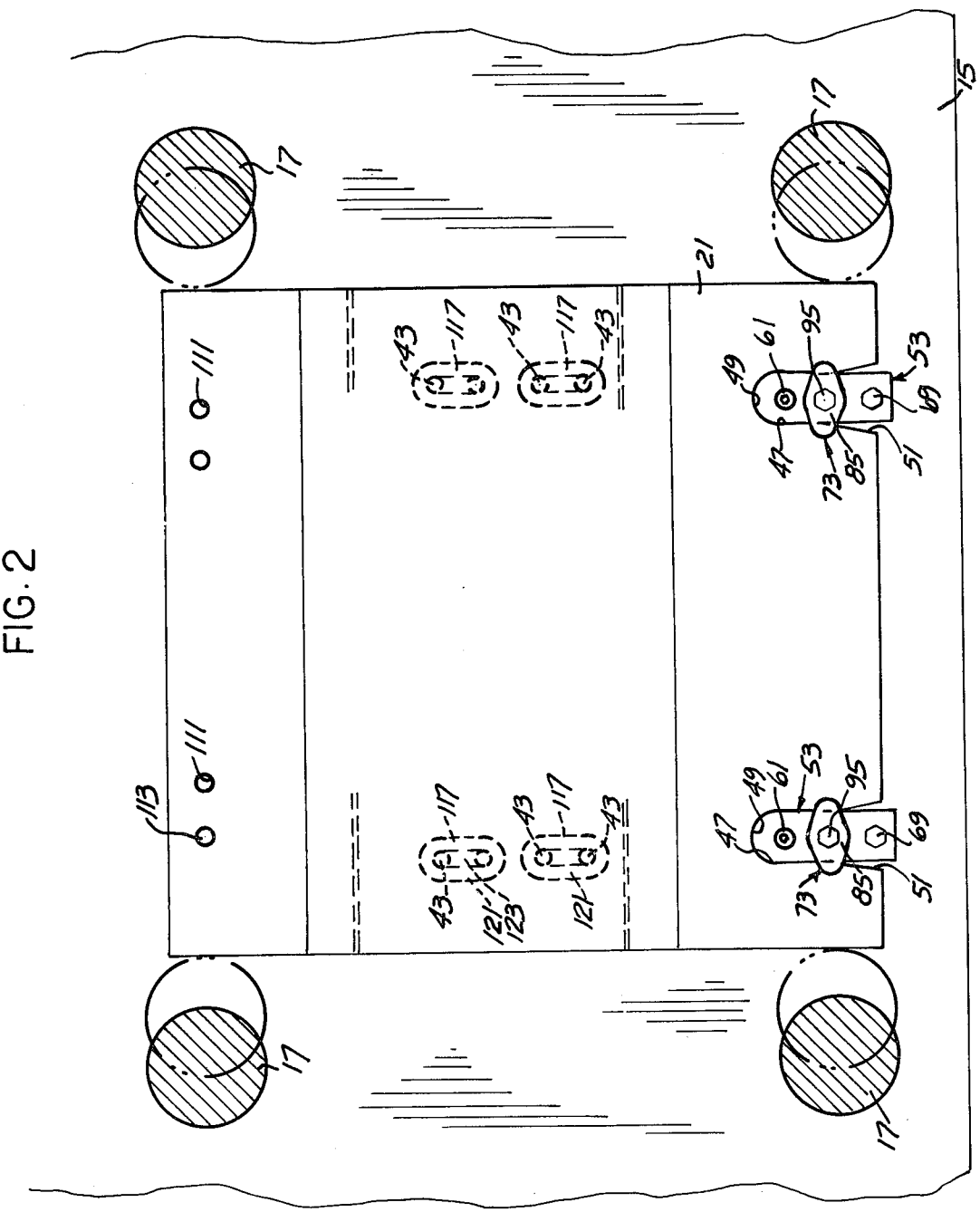
FIG. 2 is a plan view of one of the anchor plates shown in FIG. 1 interlocked with the keys of the present locator clamp assembly fragmentarily shown.

Laterally spaced pairs of opposed locator clamp assemblies 53, FIG. 2 shown in an exploded view, FIG. 3, are mounted upon and project from the respective platens 13 and 15 and are adapted for cooperative registry within corresponding laterally spaced pairs of locator slots 47 formed within the top and bottom anchor plates 23 and 21 upon one side of the mold die assembly in FIG. 2. Each of the locator slots 47 has a semi-circular portion 49 at the inner end thereof; and have diverging guide portions 51 at their outer ends adapted to cooperatively receive the corresponding locator keys of the locator key and clamp assembly 53 shown in FIGS. 3, 4, 5 and 6.

Each locator key and clamp assembly 53 includes an elongated key body 55, rectangular in cross-section and having a top surface 56. Upon one end of the key body is a semi-circular base 57 which projects from top surface 56. The corresponding portion of body 55 adjacent the base 57 is substantially semi-circular; and is adapted for cooperative nesting within the semi-circular portion 49 of slot 47 FIG. 2.

Referring to FIG. 6, transverse bore 59 is formed through body 55 and the base 57 terminates at one end within said base in a counter-bore 61. Socket headed bolt 63, sometimes referred to as a fastening means, is snugly projected into counter-bore 61 and through the bore 59 and into a corresponding threaded bore 65 formed within platen 15. A similarly spaced pair of locator key and clamp assemblies are likewise secured to the stationary platen 13.

Second transverse bore 67 is formed through the key body 55 at one end thereof adapted to receive the headed fastener 69 which is threaded into bore 65 within the adjacent platen 15 or 13 with a suitable lock washer interposed, FIG. 6. The key body 55 has a flat bottom surface 71 and a flat top surface 56, FIG. 3.

A clamp 73 of generally elliptical form, FIGS. 3 and 4, includes clamp body 85. Upon the key body 55 and projecting above the top surface 56 is the substantially circular mount boss 75 having an internally threaded bore 77, FIG. 6. Said bore terminates in the counter-bore 79 adjacent bottom surface 71 of said key. A pair of spaced upright spring bores 81 are formed within boss 75 on opposite sides of its aperture 77 and receive a pair of compression springs 83, FIGS. 3 and 6.

Figure 5:
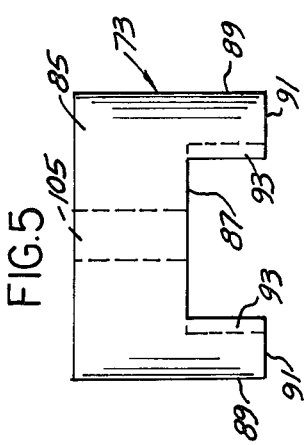
FIG. 5 is an end elevational view of the clamp body taken in the direction of arrows 5—5 of FIG. 4.

Clamp body 85 upon its undersurface 87 has an undercut generally circular bore defining opposed inner arcuate surfaces 93, FIG. 5, adapted for cooperative registry with boss 75. The undercut aperture within the key body defines at opposite ends thereof the depending anchor surfaces 91 adapted for operative retaining engagement with the adjacent outer surface of the corresponding top or bottom clamp plate 23 or 21, FIG. 1.

The corresponding compression springs 83 project above the spring bores 81 into operative yielding registry with the clamp body undersurface 87, FIG. 6. The clamp body, FIG. 5, includes the clamp flanges 89 extending from clamp body 85 and whose anchor surfaces 91 are adapted for operative retaining engagement with the corresponding anchor plate.

Headed and threaded bolt or fastener 95 with a suitable washer 107 thereon extends through the bore 105 of clamp body 85 and is threaded through the bore 77 and extends into the counter bore 79 adjacent bottom surface 71. The headed bolt 95 is adjustable relative to the body 55 along the thread 77. The corresponding springs 83 yieldably engage the undersurface 87 of the clamp body in compression.

Anchor pin 101 extends through a transverse bore 99 in the end of fastener 95 within counter bore 79, FIG. 6. As shown in FIG. 3, access to the pin 101 is through the transverse pin recesses 103, FIGS. 3, 6 and 7. Pin 101 is adapted to prevent accidental disengagement of bolt 95 from the key body upon unthreading thereof. This is both for convenience when clamping or unclamping and for safety during operation. If vibration should loosen the bolt the mold cannot disengage because bolt travel is limited.

As shown in FIG. 4, the headed portion of fastener 69 acts as a stop as at 109 limiting rotation of the clamp 73 to the clearance position shown in dash lines. This is the normal position of clamp 73 just prior to assembly of the sectional plastic molding die 19 and its corresponding top and bottom anchor plates 23 and 21 within and between the upper and lower platens 13, 15 of the molding machine 11. The locator clamp, FIG. 4 is shown full size for a 700 ton machine.

After such assembly the corresponding keys 53, at their inner semi-circular ends 57 are in cooperative registry with the inner semi-circular ends 49 of the slots 47. At that time, the corresponding clamps 73 are rotated to the solid line position, FIG. 4 so as to retainingly engage the outer surface of the corresponding clamp plate. Rotation of the clamp 73 is a further convenience. In most instances the springs 83 pressing upon the clamp will insure it will stay away from the clamp plate when bolt 95 is in fully loosened position. Typically, about ¼" of play is sufficient to remove the mold.

To further secure the respective clamp plates to the top and bottom platens of the molding machine, there are provided through the outer surface portions of the top and bottom clamp plates 23, 21 on the side opposite the slots 47 a plurality of apertures 111, FIGS. 1 and 2 through which extend threaded fasteners 113 for securing registry with adjacent portions of the underlying platens 13 and 15 of the molding machine.

As schematically shown in FIG. 1, there are normally provided a plurality of pairs of laterally spaced knock-out bars 43 connected with some portion of the molding machine.

The bottom clamp plate 21, in FIG. 1, has corresponding elongated clearance slots 117 therethrough. Elongated lifter plates 121 have undercut slots 123 to receive the undercut heads 119 of the knockout bars 43. Thus upon assembly of the bottom clamp plate 21 of the molding die with respect to the keys on platen 15, the undercut heads 119 of the knock-out bars extend along the slots 123 within the lifter plates 121. The lifter plates are connected to the ejector plate 31 by fasteners 125.

Thus the clearance slots 117 in the bottom anchor plate 21 are movable with respect to the knock-out bars 143 and at the same time, the undercut heads 119 of the knock-out bars 43 are movably positioned with the undercut slots 123 within the lifter plates 121 secured to the ejector plate 31.

By the foregoing construction, once a molding job has been completed, it is a simple matter to separate the sectional plastic molding die 19 and associated clamp plates 21, 23 from the molding machine merely by disconnecting the fasteners 113 between the clamp plates and platens and successively swing the clamps 73 to the dash line clearance position shown in FIG. 4.

At that time, the complete sectional plastic mold die 19 may be removed and a similar plastic mold die assembly is replaced therein and wherein a different set of core block and cavity plate are employed for a different molding operation. The advantage of this construction is that providing a uniformity of the location of the clearance slots 47 within the corresponding clamp plates of the respective mold assemblies, the present quick change locator clamp assemblies may be employed which at all times are mounted upon the corresponding platens of the molding machine.

Having described my invention, reference should now be had to the following claims:

I claim:

1. A locator clamp for securing slotted portions of the top and bottom clamp plates of a plastic molding sectional die with respect to the corresponding top and bottom platens of a plastic molding machine, said clamp including an elongated locator key adapted for securing to a platen and adapted to snugly and guidably receive a corresponding clamp plate slot;

and a rotatable clamp mounted upon and secured to said key having a clearance position and a manually rotated position adapted for operative retaining engagement with a clamp plate;

said key including an elongated body having a top surface;

a substantially circular mount boss upon said body intermediate its ends, extending above said top surface, said mount boss having a threaded aperture;

said clamp including an elongated centrally apertured clamp body having a substantially circular undercut recess receiving said boss;

end portions of said clamp body adapted for operative engagement with a clamp plate;

and fastening means extending through said clamp body and threaded into said boss;

said clamp body being rotatable relative to said fastening means.

2. A quick change locator clamp assembly for a plastic molding machine having opposed stationary top and movable bottom platens adapted to receive, mount and support a sectional molding die having top and bottom guidably interconnected clamp plates and a reciprocal ejector plate, comprising;

laterally spaced pairs of opposed locator clamp assemblies mounted upon and projecting inwardly of said platens;

there being formed in said clamp plates upon one side of said molding die similarly spaced opposed outwardly opening pairs of locator slots;

each locator clamp assembly including an elongated locator key mounted upon and secured to a platen extending outwardly thereof, of a shape and size to snugly and guidably receive a corresponding clamp plate slot for locating the molding die in a predetermined position relative to said platens;

a rotatable clamp mounted upon and secured to said key having a clearance position and a manually rotated position in operative retaining engagement with the adjacent clamp plate;

fasteners upon the other side of said molding die securing said clamp plates to said platens respectively;

said locator keys, clamps and fasteners respectively securing said clamp plates and molding die to said platens;

said locator key including an elongated body having a top surface registerable with an anchor plate outer surface;

a substantially semi-circular base upon said body projecting above said top surface, the end of said body corresponding to said base being substantially semi-circular;

a substantially circular mount boss upon said body intermediate its ends projecting above said top surface, said mount boss having a threaded aperture therethrough;

said clamp including an elongated centrally apertured clamp body having a substantially circular undercut recess receiving said boss;

end portions of said clamp body adapted for operative retaining engagement with a clamp plate outer surface;

and fastening means extending through said clamp body and threaded into said boss, said clamp body being rotatable relative to said fastening means.

3. A quick change locator clamp assembly for a plastic molding machine having opposed stationary top and movable bottom platens adapted to receive, mount and support a sectional molding die having top and bottom guidably interconnected clamp plates and a reciprocal ejector plate, comprising;

laterally spaced pairs of opposed locator clamp assemblies mounted upon and projecting inwardly of said platens;

there being formed in said clamp plates upon one side of said molding die similarly spaced opposed outwardly opening pairs of locator slots;

each locator clamp assembly including an elongated locator key mounted upon and secured to a platen extending outwardly thereof, of a shape and size to snugly and guidably receive a corresponding clamp plate slot for locating the molding die in a predetermined position relative to said platens;

a rotatable clamp mounted upon and secured to said key having a clearance position and a manually rotated position in operative retaining engagement with the adjacent clamp plate;

fasteners upon the other side of said molding die securing said clamp plates to said platens respectively;

said locator keys, clamps and fasteners respectively securing said clamp plates and molding die to said platens;

said locator key including an elongated body having a top surface registerable with an anchor plate outer surface;

a substantially circular mount boss upon said body intermediate its ends and projecting above said top surface, said mount boss having a threaded apeture;

said clamp including an elongated centrally apertured clamp body having a substantially circular undercut recess receiving said boss;

end portions of said clamp body adapted for operative retaining engagement with a clamp plate outer surface;

fastening means extending through said clamp body and threaded into said boss, said clamp body being rotatable relative to said fastening means;

said fastening means including a pair of opposed bores in said boss outwardly of its aperture;

and a coil compression spring nested in each bore, at one end projecting above said bore yieldably engaging said clamp body.

4. A quick change locator clamp assembly for a plastic molding machine having opposed stationary top and movable bottom platens adapted to receive, mount and support a sectional molding die having top and bottom guidably interconnected clamp plates and a reciprocal ejector plate, comprising;

laterally spaced pairs of opposed locator clamp assemblies mounted upon and projecting inwardly of said platens;

there being formed in said clamp plates upon one side of said molding die similarly spaced opposed outwardly opening pairs of locator slots;

each locator clamp assembly including an elongated locator key mounted upon and secured to a platen extending outwardly thereof, of a shape and size to snugly and guidably receive a corresponding clamp plate slot for locating the molding die in a predetermined position relative to said platens;

a rotatable clamp mounted upon and secured to said key having a clearance position and a manually rotated position in operative retaining engagement with the adjacent clamp plate;

fasteners upon the other side of said molding die securing said clamp plates to said platens respectively;

said locator keys, clamps and fasteners respectively securing said clamp plates and molding die to said platens;

said locator key including an elongated body having a top surface registerable with an anchor plate outer surface;

a substantially circular mount boss upon said body intermediate its ends and projecting above said top surface, said mount boss having a threaded aperture;

said clamp including an elongated centrally apertured clamp body having a substantially circular undercut recess receiving said boss;

end portions of said clamp body adapted for operative retaining engagement with a clamp plate outer surface;

fastening means extending through said clamp body and threaded into said boss, said clamp body being rotatable relative to said fastening means;

said key body having an undercut counterbore coaxial of said threaded aperture receiving the end of said fastening means;

and an anchor pin projecting transversely through of the end of said fastening means and nested within said counter bore limiting unthreading of said fastening means relative to said key body.

5. A quick change locator clamp assembly for a plastic molding machine having opposed stationary top and movable bottom platens adapted to receive, mount and support a sectional molding die having top and bottom guidably interconnected clamp plates and a reciprocal ejector plate, comprising;

laterally spaced pairs of opposed locator clamp assemblies mounted upon and projecting inwardly of said platens;

there being formed in said clamp plates upon one side of said molding die similarly spaced opposed outwardly opening pairs of locator slots;

each locator clamp assembly including an elongated locator key mounted upon and secured to a platen extending outwardly thereof, of a shape and size to snugly and guidably receive a corresponding clamp plate slot for locating the molding die in a predetermined position relative to said platens;

a rotatable clamp mounted upon and secured to said key having a clearance position and a manually rotated position in operative retaining engagement with the adjacent clamp plate;

and fasteners upon the other side of said molding die securing said clamp plates to said platens respectively;

said locator keys, clamps and fasteners respectively securing said clamp plates and molding die to said platens;

the securing of each key to a platen including a pair of longitudinally spaced fasteners extending through, retainingly engaging said key and threaded into said platen;

one of said key fasteners having a head retainingly engaging and extending above said key;

said rotatable clamp being engagable with said headed fastener when in its clearance position.

6. A locator clamp for securing slotted portions of the top and bottom clamp plates of a plastic molding sectional die with respect to the corresponding top and bottom platens of a plastic molding machine, said clamp including an elongated locator key adapted for securing to a platen and adapted to snugly and guidably receive a corresponding clamp plate slot;

and a rotatable clamp mounted upon and secured to said key having a clearance position and a manually rotated position adapted for operative retaining engagement with a clamp plate;

said key including an elongated body having a top surface;

a substantially circular mount boss upon said body intermediate its ends, extending above said top surface, said mount boss having a threaded aperture;

said clamp including an elongated centrally apertured clamp body having a substantially circular undercut recess receiving said boss;

end portions of said clamp body adapted for operative engagement with a clamp plate;

and fastening means extending through said clamp body and threaded into said boss;

said clamp body being rotatable relative to said fastening means;

said fastening means including a pair of opposed bores in said boss outwardly of its aperture;

and a pair of compression springs nested in said bores at one end projecting above said base yieldably engaging said clamp body;

said key body having an undercut counterbore coaxial of said threaded aperture receiving the end of said fastening means;

and an anchor pin projecting through the end of said fastening means transversely thereof and nested within said counterbore limiting unthreading of said fastening means.

7. A quick change locator clamp assembly for a plastic molding machine having opposed stationary top and movable bottom platens adapted to receive, mount and support a sectional molding die having top and bottom guidably interconnected clamp plates and a reciprocal ejector plate, comprising;

laterally spaced pairs of opposed locator clamp assemblies mounted upon and projecting inwardly of said platens;

there being formed in said clamp plates upon one side of said molding die similarly spaced opposed outwardly opening pairs of locator slots;

each locator clamp assembly including an elongated locator key mounted upon and secured to a platen extending outwardly thereof, of a shape and size to snugly and guidably receive a corresponding clamp plate slot for locating the molding die in a predetermined position relative to said platens;

a rotatable clamp mounted upon and secured to said key having a clearance position and a manually rotated position in operative retaining engagement with the adjacent clamp plate;

and fasteners upon the other side of said molding die securing said clamp plates to said platens respectively;

said locator keys, clamps and fasteners respectively securing said clamp plates and molding die to said platens;

said molding machine including at least one reciprocal knock-out bar guidably projected through said bottom platen;

a lifter plate guidably mounted within said bottom anchor plate for transverse reciprocal movements, at one end connected to said ejector plate and at its other end having an elongated undercut slot parallel to said locator slots;

and a head upon the end of said knock-out bar positionable within said undercut slot and relatively movable and interlockable therein on assembly of said clamp plates relative to said keys.

8. In the quick change locator clamp of claim 7, said locator key including an elongated body having a top surface registerable with an anchor plate outer surface;

a substantially semi-circular base upon said body projecting above said top surface, the end of said body corresponding to said base being substantially semi-circular;

a substantially circular mount boss upon said body intermediate its ends projecting above said top surface, said mount boss having a threaded aperture therethrough;

said clamp including an elongated centrally apertured clamp body having a substantially circular undercut recess receiving said boss;

end portions of said clamp body adapted for operative retaining engagement with a clamp plate outer surface;

and fastening means extending through said clamp body and threaded into said boss, said clamp body being rotatable relative to said fastening means.

9. In the quick change locator clamp of claim 7, said locator key including an elongated body having a top surface registerable with an anchor plate outer surface;

a substantially circular mount boss upon said body intermediate its ends and projecting above said top surface, said mount boss having a threaded aperture;

said clamp including an elongated centrally apertured clamp body having a substantially circular undercut recess receiving said boss;

end portions of said clamp body adapted for operative retaining engagement with a clamp plate outer surface;

and fastening means extending through said clamp body and threaded into said boss, said clamp body being rotatable relative to said fastening means.

10. In the locator clamp of claim 7, said molding machine including laterally spaced pairs of spaced aligned knock-out bars guidably projected through said bottom platen;

there being corresponding spaced pairs of spaced aligned lifter plates guidably mounted within said bottom anchor plate for transverse reciprocal movements, at one end respectively connected to said ejector plate;

each lifter plate having an elongated undercut slot, parallel to said locator slots;

and a head on the end of each knock-out bar projected into said undercut slots and interlocked therewith.

* * * * *